United States Patent [19]

Narusawa et al.

[11] 3,997,463

[45] Dec. 14, 1976

[54] NEMATIC LIQUID CRYSTAL COMPOSITION FOR ELECTRO-OPTICAL DISPLAYS

[75] Inventors: Toshiaki Narusawa; Hirofumi Okuyama, both Sagamihara; Junjiro Goto, Kobe; Yasuji Isozaki, Tokyo; Masatoshi Fujimori, Musashino,, Japan

[73] Assignee: Fujitsu Limited, Kawasaki, Japan

[22] Filed: Mar. 21, 1975

[21] Appl. No.: 560,620

[30] Foreign Application Priority Data

Mar. 25, 1974  Japan ................ 49-33743

[52] U.S. Cl. .................. 252/299; 350/160 LC
[51] Int. Cl.$^2$ ............... C09K 3/34; G02F 1/13
[58] Field of Search .......... 252/299, 408; 350/160 LC

[56] References Cited

UNITED STATES PATENTS

| | | | |
|---|---|---|---|
| 3,655,270 | 4/1972 | Creagh | 252/299 |
| 3,816,113 | 6/1974 | Haas et al. | 252/408 |
| 3,838,059 | 9/1974 | Wong | 252/299 |

OTHER PUBLICATIONS

Creagh, L. T., Proc. of the IEEE, vol 61, No. 7, pp. 814–821, (July 1973).

*Primary Examiner*—Benjamin R. Padgett
*Assistant Examiner*—T. S. Gron
*Attorney, Agent, or Firm*—1

[57] ABSTRACT

A nematic liquid crystal composition, including p-methoxybenzylidene-p'-n-butylaniline, p-butoxybenzylidene-p'-n-butylaniline and bis(p'-n-octyloxy benzylidene)-chloro-p-phenylenediamine, has desirable thermodynamic properties, including a nematic mesophase over a wide temperature range, and also has a high dynamic scattering contrast ratio.

2 Claims, 4 Drawing Figures

(BOCPD—MBBA)

(MBBA—BBBA)

NEMATIC LIQUID CRYSTAL COMPOSITION FOR ELECTRO-OPTICAL DISPLAYS

BACKGROUND OF THE INVENTION

1. Field of the Invention

This invention relates to novel nematic liquid crystal compositions having electro-optical properties which change their optical characteristics in response to an electric field applied thereto

2. Description of the Prior Art

It is well known that certain nematic liquid crystal materials show an electro-optical scattering effect according to the voltage applied. These materials are widely used in electro-optical devices, such as alphanumeric displays and light-valves. Such devices are described in more detail in the U.S. Pat. No. 3,322,485 by Richard Williams and the U.S. Pat. No. 3,499,112 by George H. Heilmeier et al.

The useful temperature range of such electro-optical devices employing nematic liquid crystals is limited by the temperature range over which the nematic liquid crystal material filled in the interior exhibits the nematic mesophase.

Known organic liquid crystal single compounds having the nematic mesophase temperature range around room temperature usually have an operable temperature differential of about 20° C to 40° C, which is extremely restrictive. For example, p-methoxybenzylidene-p'-n-butylaniline (hereinafter referred to as MBBA) has a nematic mesophase from 20° C to 47° C, while p-ethoxybenzylidene-p'-n-butylaniline (hereinafter referred to as EBBA), has the temperature range of 37° C to 80° C. Electro-optical devices employing the nematic liquid crystal are often desired to be used at normal ambient temperature from −20° C to 80° C, but such organic compounds as the MBBA, EBBA or other typical nematic liquid crystal materials are not operable over the entire range of desired temperatures.

Attempts have been made by prior workers for formulating a nematic liquid crystal composition possessing wider temperature range by mixing several kinds of nematic liquid crystal material. For instance, the nematic liquid crystal composition obtained by mixing MBBA and EBBA with the weight ratio of 2:1 produces a nematic liquid crystal in the temperature range from 15° C to 60° C. When the temperature is raised gradually from low temperature, the nematic liquid crystal composition including the MBBA and EBBA with the weight ratio of 2:1 changes from the solid phase to the nematic liquid crystal phase at 15° C and further changes into the isotropic phase at 60° C.

The transition temperature from the solid phase to nematic liquid crystal phase is called the S → N point. The temperature for transition from the nematic liquid crystal phase to the isotropic phase is called the N → I point. However, the phase changes do not reverse at the same temperatures. When the temperature is lowered gradually from a high temperature, the binary 2:1 MBBA:EBBA nematic liquid crystal composition changes into the nematic liquid crystal phase from the isotropic phase at 60° C and further changes into the solid phase at −5° C. These transition temperatures are also called the I → N point and the N → S point, respectively. In general the temperature for the S → N point is higher than the N → S point and the binary liquid crystal composition has a nematic liquid crystal phase within the effective temperature range from −5° C to 60° C. However, the liquid crystal composition is in a phase called the supercooling phase at a temperature from the N → S point at −5° C to the S → N point at 15° C and when some stimulation is given, the composition may crystallize into the solid phase. For example, when some external forces are imposed on the liquid crystal or when the purity of the liquid crystal composition differs, the liquid crystal phase itself under the supercooling phase becomes thermodynamically unstable, and the liquid crystal composition may fail to show the nematic mesophase properties under the said supercooling conditions. Therefore, the operable temperature range for electro-optic devices cannot be determined reliably.

SUMMARY OF THE INVENTION

A new nematic liquid crystal composition has been discovered which has a good operating temperature range for electro-optical use and good contrast ratio in the dynamic scattering mode. The present invention provides a novel nematic liquid crystal composition which overcomes the problems of the supercooling phase. An important object of the present invention lies in providing ternary nematic liquid crystal compositions having no supercooling phase and having a wide temperature range from the S → N point to the N → I point. Another object of the present invention is to provide a nematic liquid crystal composition having a wider temperature range from the nematic phase, especially in the low temperature region.

A further object of the present invention lies in an improved electro-optical display device with transparent electrodes and a novel nematic liquid crystal composition having a high contrast ratio sealed between the electrodes.

In order to achieve the above objects and features, a nematic novel liquid crystal composition has been found which consists essentially of a ternary composition including p-methoxybenzylidene-p'-n-butylaniline (MBBA), p-n-butoxybenzylidene-p'-n-butylaniline (BBBA) and bis-(pp'-n-octyloxybenzylidene)-chloro-p-phenylenediamine (BOCPD). It has been found that a minor amount (up to about 50 wt %) of the BOCPD component is effective to decrease the S → N point of the MBBA-BBBA mixture and also enhances the optical reading properties of the mixture. In the preferred embodiments of the invention the MBBA and BBBA components are present in a weight ratio of about 40:60 to 70:30, respectively.

These and other objects and features of the invention will be apparent to one skilled in the art of electro-optical devices and liquid crystals from the following description and in the drawings.

DESCRIPTION OF THE PREFERRED EMBODIMENTS

Metric units and parts by weight are employed in the following description, unless otherwise indicated.

The invention can best be understood after a brief review of the thermodynamic properties of individual components and mixtures. In case of the EBBA and MBBA, a phase change to the solid phase from the nematic liquid crystal phase occurs at low temperature. A large amount of energy is required in order to change these materials into the nematic liquid crystal phase from the solid phase. This results in the S → N point occurring at a high temperature. Also, each individual component exists in the crystal phase as a pure crystal. Some nematic liquid crystals change from the nematic liquid crystal phase into a smectic liquid crystal phase in the low temperature region and tend to become stable even if they are cooled further. p-butoxybenzylidene-p'-n-butylaniline (hereinafter referred to as BBBA) is known for this property. Because such transition from the smectic liquid crystal phase to the nematic phase does not require much energy and each component exists as the solid phase in the smectic mesophase, it is believed that the supercooling phase does not exist in a mixture of the BBBA and other nematic liquid crystals.

The nematic liquid crystal temperature range of the BBBA alone is limited to 46° C to 75° C, and BBBA does not show the nematic mesophase at normal ambient temperature as a single compound. Thus, it is required to form a stable mixture of a nematic liquid crystal and the BBBA in order to obtain nematic phase at the room temperature. MBBA is the only liquid crystal found to satisfy such requirement. The nematic liquid crystal temperature range of MBBA ranges from 21° C to 47° C and the mixture of the MBBA and BBBA does not produce the supercooling phase.

However, the mixed liquid crystal consisting of the MBBA and BBBA, was found not to have sufficiently wide temperature range in the nematic mesophase to be practical for electro-optical devices.

Bis-p'-n-octyloxybenzylidene)-chloro-p-phenylenediamine (hereinafter referred to as BOCPD) has been found useful in modifying the thermodynamic and optical properties of the binary mixture. BODPD has double- Schiff's base structure and differs in molecular structure from the single Schiff's base of the MBBA and BBBA. However, the nematic liquid crystal temperature range of BOCPD is 62° C to 179° C.

Figure 1:
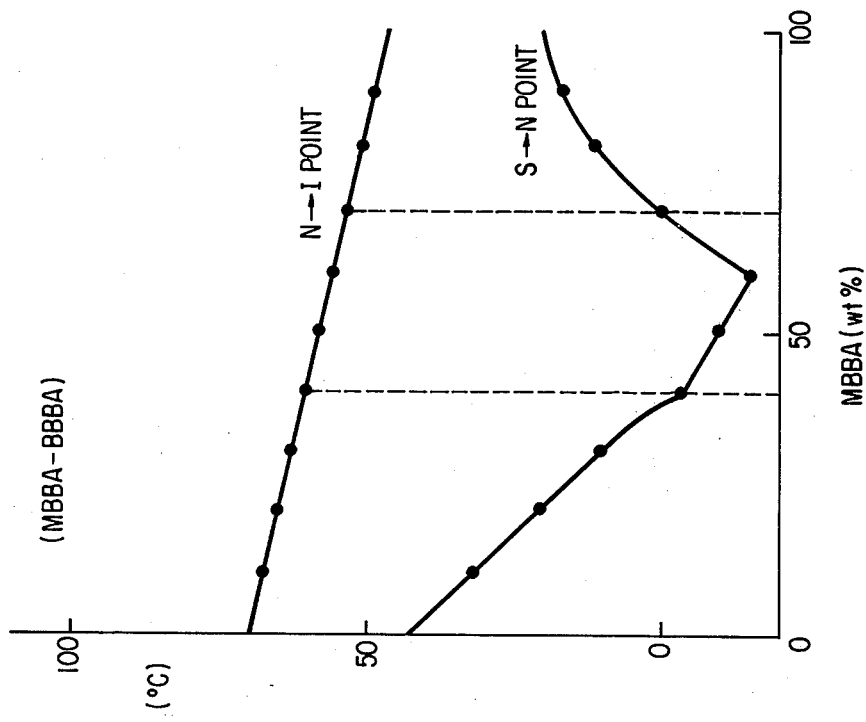
FIG. 1 is a phase diagram of a prior art binary composition of MBBA-BBBA.

FIG. 1 is a phase diagram of the mixed composition of the MBBA and BBBA, which can be obtained by plotting the results of temperature at the N → I point and S → N point, by changing the weight ratio of the MBBA and BBBA.

The results of the above measurement are shown in Table 1.

TABLE 1

| Material weight % | | Temperature | |
| MBBA | BBBA | S──→N point | N──→I point |
| --- | --- | --- | --- |
| 100 | 0 | 21.5° C | 47.0° C |
| 90 | 10 | 16.5° C | 47.5° C |
| 80 | 20 | 10.5° C | 50.5° C |
| 70 | 30 | 0° C | 54.0° C |
| 60 | 40 | −15.0° C | 56.5° C |
| 50 | 50 | −9.0° C | 59.5° C |
| 40 | 60 | −3.0° C | 62.5° C |
| 30 | 70 | 12.0° C | 65.0° C |
| 20 | 80 | 22.0° C | 68.0° C |
| 10 | 90 | 32.5° C | 70.5° C |
| 0 | 100 | 43.0° C | 74.5° C |

In FIG. 1, the S → N point and N → I point for several proportions are shown by plotting the temperature on the vertical axis (° C) and the mixing rate (weight percent) of the MBBA on the lateral axis of a rectilinear graph. According to this plot, when the MBBA and the BBBA are mixed at the ratio of 60:40, a liquid crystal composition showing the minimum S → N point of −15° C and resultant N → I point of 56° C can be obtained. The S → N point (−15° C) shown in FIG. 1 is called the eutectic point. This binary ratio shows the widest liquid crystal temperature range. In addition, in this eutectic system, the unstable supercooling phase such as found in a mixture of MBBA and EBBA does not exist. It is apparent that the N → I point shows the primary relation according to the increase of BBBA. The nematic liquid crystal temperature range has a maximum value of 70° C, which is insufficient from a practical point of view.

Figure 2:
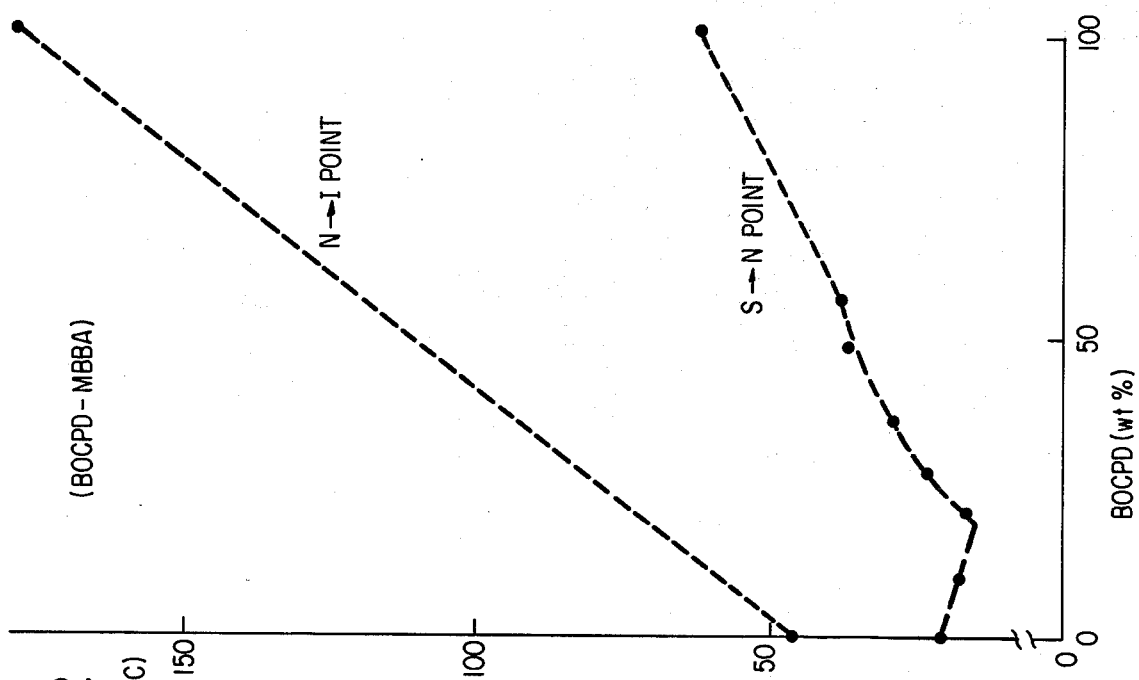
FIG. 2 is a phase diagram of the mixed composition of the BOCPD-MBBA.

FIG. 2 is a phase diagram of a binary mixture of BOCPD and MBBA which can be obtained by plotting the results of measurement for the S → N point when the weight ratio of the BOCPD MBBA is increased. The N → I point is plotted as a theoretical value, since it shows the primary relation for the increase of liquid crystal material to be added. These results are shown in Table 2.

TABLE 2

| Material weight % | | Temperature |
| MBBA | BOCPD | S──→N point |
| --- | --- | --- |
| 89.5% | 10.5% | 18.0° C |
| 79.2% | 20.8% | 16.5° C |
| 72.5% | 27.5% | 23.5° C |
| 63.2% | 36.8% | 30.0° C |
| 51.4% | 48.6% | 36.5° C |
| 43.4% | 56.6% | 38.5° C |

The eutectic point of binary BOCPD-MBBA is found at 20% BOCPD, corresponding to a S → N point of 15° C.

Figure 3:
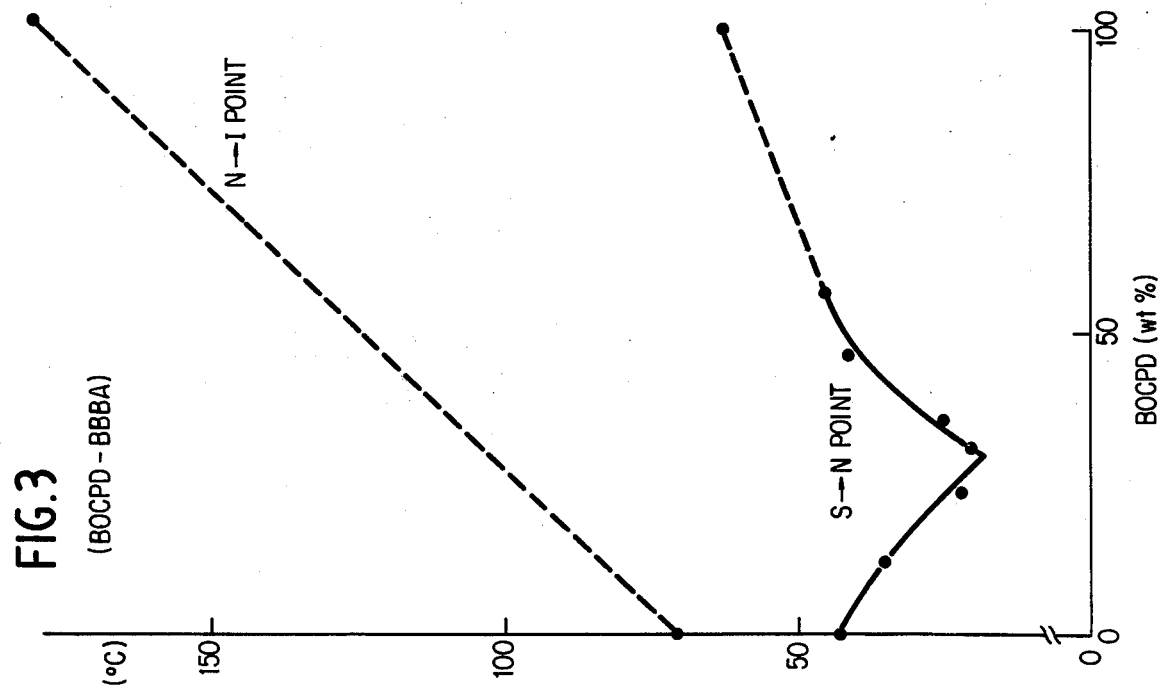
FIG. 3 is a phase diagram of the mixed composition of the BOCPD-BBBA.

FIG. 3 is the phase diagram of a binary mixture of the BOCPD and BBBA, which can be obtained by plotting the results of measurement for the S → N point with wt% BOCPD increasing. The N → I point is again plotted as the theoretical value. The results are shown in Table 3.

TABLE 3

| Material weight % | | Temperature |
| BBBA | BOCPD | S──→N point |
| --- | --- | --- |
| 87.6 | 12.4 | 35.0° C |
| 76.8 | 23.2 | 22.0° C |
| 69.4 | 30.6 | 20.0° C |
| 64.4 | 35.6 | 25.0° C |
| 53.4 | 46.6 | 41.0° C |
| 44.1 | 55.6 | 44.5° C |

In this system, the eutectic point is formed with the S → N point at about 20° C and the N → I point at 103° C corresponding to 30% BOCPD.

From these figures, it has been demonstrated that the nematic liquid crystal temperature range can be widened by mixing the BOCPD into the BBBA or MBBA. However, it does not provide a stable nematic liquid crystal phase at normal room temperature. Thus, for the purpose of obtaining a nematic liquid crystal composition which shows a stable nematic liquid crystal phase at ambient temperature having wider nematic liquid crystal phase temperature range, the BOCPD is added to the mixture of the MBBA-BBBA. As a result of this ternary mixture, a stable nematic liquid crystal phase of the MBBA-BBBA at around the room temperature and wide nematic liquid crystal temperature range have been attained simultaneously.

The result of thermodynamic measurements for ternary mixtures obtained by adding BOCPD to a mixture of the MBBA and BBBA with a weight ratio of 60:40 is shown in Table 4.

TABLE 4

| Material weight % | | Temperature | |
|---|---|---|---|
| MBBA+ BBBA (60:40) | BOCPD | N⟶I point | S⟶N point |
| 0 | 100 | 179° C | 62.5° C |
| 10.4 | 89.6 | 163° C | 55.5° C |
| 20.2 | 79.8 | 150.5° C | 49.0° C |
| 30.6 | 69.4 | 132.8° C | 45.0° C |
| 39.5 | 60.5 | 125.2° C | 40.5° C |
| 53.2 | 46.8 | 120.0° C | 21.5° C |
| 72.7 | 27.3 | 90.0° C | −16.0° C |
| 75.1 | 24.9 | 86.0° C | −17.5° C |
| 86.9 | 13.1 | 71.5° C | −18.5° C |
| 93.6 | 6.4 | 62.7° C | −19.5° C |
| 100 | 0 | 56.5° C | −15.0° C |

The results of adding BOCPD to the mixture of MBBA and BBBA having a weight ratio of 40:60 are shown in Table 5.

TABLE 5

| Material weight % | | Temperature |
|---|---|---|
| MBBA + BBBA (40:60) | BOCPD | S⟶N point |
| 100 | 0 | −3.0° C |
| 92.0 | 8.0 | −7.0° C |
| 81.0 | 19.0 | −9.5° C |
| 72.5 | 27.5 | −3.5° C |
| 65.0 | 35.0 | 6.0° C |
| 55.5 | 44.5 | 25.5° C |

Further measurements were made for the addition of BOCPD to a mixture of the MBBA and BBBA with a weight ratio of 70:30. These results are shown in Table 6.

TABLE 6

| Material weight % | | Temperature |
|---|---|---|
| MBBA + BBBA (70:30) | BOCPD | S⟶N point |
| 100 | 0 | 0° C |
| 92.5 | 7.5 | −2.0% C |
| 84.5 | 15.5 | −3.5° C |
| 76.0 | 24.0 | 0.5° C |
| 67.5 | 32.5 | 5.5° C |
| 60.5 | 39.5 | 15.0° C |
| 52.0 | 48.0 | 27.0° C |

Figure 4:
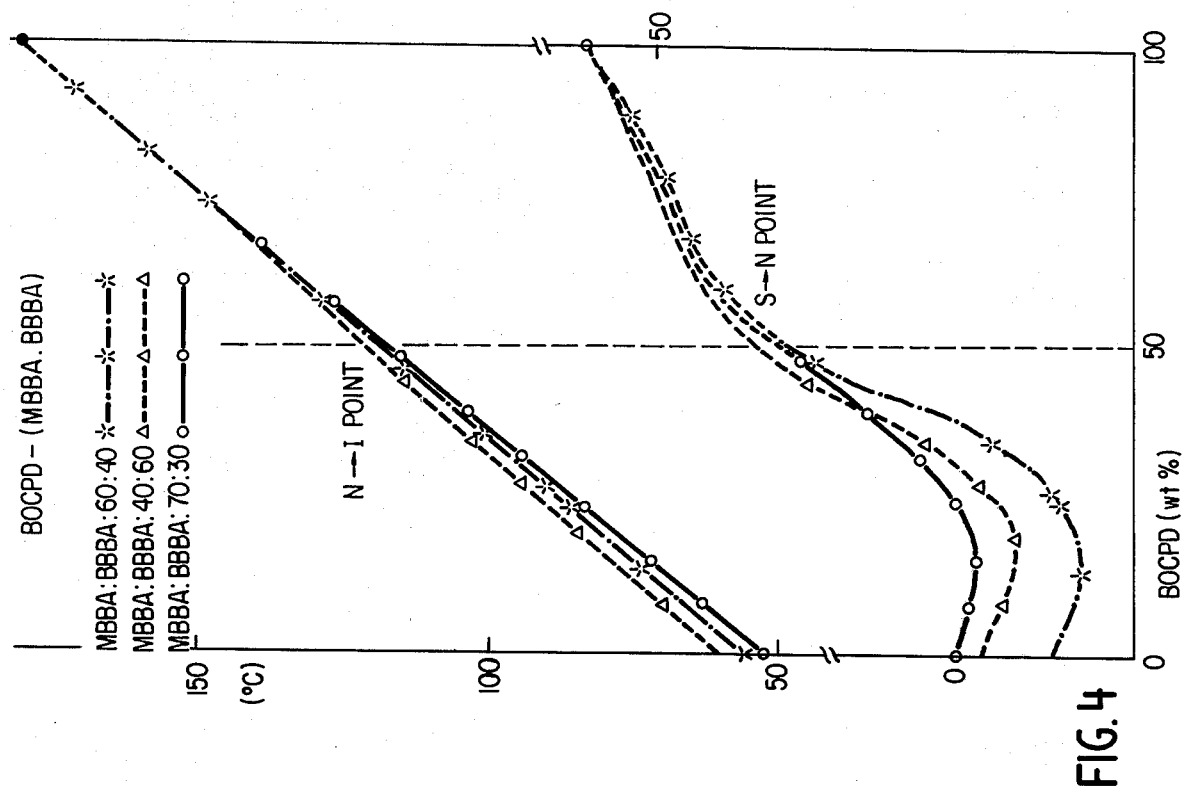
FIG. 4 is a phase diagram of the novel ternary compositions of the MBBA-BBBA and BOCPD.

FIG. 4 is a phase diagram of the ternary mixtures consisting essentially of MBBA, BBBA and BOCPD, and summarizes Tables 4, 5 and 6. The vertical axis is temperature (° C) and the lateral axis, the weight percent of BOCPD.

When the amount of BOCPD changes from 0% where the N → I point is at 55° C and the S → N point is at −15° C where the MBBA:BBBA ratio is 60:40 to 100% where the N → I point is at 179° C and the S → N point is at 62.5° C, the N → I point shows the linear characteristic while the S → N point, the non-linear characteristic with the minimum temperature of −20° C.

Similarly, where the MBBA:BBBA ratio is 40:60, the amount of BOCPD changes from 0% where the N → I point is at 60° C and the S → N point is at −5° C to 100% where the N → I point is at 179° C and the S → N point is at 62.5° C, the N → I point shows the linear characteristic while the S → N point, the non-linear characteristic with the minimum temperature of −9.5° C.

Similar thermodynamic properties are obtained where the MBBA:BBBA ratio is 70:30.

The optical contrast properties of the liquid crystal composition of the present invention also change markedly by adding BOCPD. The contrast can be measured by the following method. The liquid crystal sample material is sealed between transparent electrodes to obtain a liquid crystal panel. The liquid crystal panel is irradiated with the light at one side. A photo-electric converter is mounted at the other side of the said liquid crystal panel to detect the passing light from the liquid crystal panel.

The contrast is defined by the ratio of the intensity $I_o$ of the passing light when no voltage is applied to the liquid crystal panel and the intensity $I_v$ of the passing light when the dynamic scattering mode is generated by the voltage applied to the said liquid crystal panel (Contrast = $I_o/I_v$). The measurements were made at 25° C with a 15μ gap between substrates and 50Hz square-wave applied voltage. For these measurements, a pure MBBA liquid crystal composition and the novel ternary liquid crystal composition were compared. Particularly, in the latter case, 35% BOCPD is mixed with 65% MBBA:BBBA (weight ratio of 60:40). The results are shown in Table 7.

TABLE 7

| Applied voltage (volt) | Contrast ratio | |
|---|---|---|
| | MBBA | Ternary Mixture |
| 0 | 1.0 | 1.0 |
| 5 | 1.0 | 1.0 |
| 8 | 1.0 | 1.5 |
| 9 | 1.2 | 3.2 |
| 10 | 2.4 | 5.2 |
| 12 | 6.9 | 13 |
| 20 | 18.0 | 30.0 |
| 30 | 35.0 | 65.0 |

As shown above, the liquid crystal composition of the present invention has a high contrast compared to MBBA alone.

As described previously, the novel liquid crystal composition is capable of showing a stable nematic liquid crystal phase within the wider temperature range, including room temperature. In addition, the ternary liquid crystal composition can be applied both to the dynamic scattering mode and the field effect mode.

Other materials may be added to the ternary mixture provided no deleterious effects are obtained thereby. In case of the dynamic scattering mode, quaternary ammonium salts may be added to the ternary mixture in order to assure this mode.

From these data, it can be seen that the liquid crystal composition of the present invention consisting essentially of MBBA, BBBA and BOCPD shows excellent phase/temperature performance. Sufficiently wider nematic temperature region covering the normal temperature is achieved without allowing the existence of supercooling phase. This new liquid crystal composition is particularly effective when the weight percentage of the BOCPD is 50% or less for the mixture of the MBBA and BBBA.

The amount of BOCPD usually is chosen to be in the range of about 5 to 50 wt%. A contrast ratio in the dynamic scattering mode of more than twice the typical 60:40 binary mixture can be obtained using BOCPD in the amount of about 10 to 45 wt% of the total composition. Optimum contrast and temperature characteristics are found using 20 to 35 wt% BOCPD.

It is preferred that the total amounts of MBBA and BBBA be present in a major amount (at least 50 wt%). These materials are particularly effective when their weight ratio (MBBA to BBBA) is within the proportions of about 40:60 to 70:30; that is, when the MBBA is 40 to 70% of their binary weight and BBBA is 30 to 60%.

While the invention has been shown by particular examples, there is no intent to limit the inventive concept except as shown in the following claims.

We claim:

1. A nematic liquid crystal composition consisting essentially of about 10 to 45 wt% of bis-(p'-n-octyloxybenzylidene)-chloro-p-phenylenediamine (BOCPD) and about 55 to 90 wt% of a mixture of p-methoxybenzylidene-p'-n-butylaniline (MBBA) and p-n-butoxybenzylidene-p'-n-butylaniline (BBBA), said MBBA and BBBA being in a weight ratio of about 40:60 to 70:30 respectively.

2. A nematic liquid crystal composition consisting essentially of about 20 to 35 wt% of bis-(p'-n-octyloxybenzylidene)-chloro-p-phenylenediamine (BOCPD) and about 65 to 80 wt% of a mixture of p-methoxybenzylidene-p'-n-butylaniline (MBBA) and p-n-butoxybenzylidene-p'-n-butylaniline (BBBA), said MBBA and BBBA being in a weight ratio of about 40:60 to 70:30 respectively.

* * * * *

UNITED STATES PATENT AND TRADEMARK OFFICE
CERTIFICATE OF CORRECTION

PATENT NO. : 3,997,463
DATED : December 14, 1976
INVENTOR(S) : Toshiaki Narusawa et al It is certified that error appears in the above-identified patent and that said Letters Patent are hereby corrected as shown below:

Column 1, line 10, after "thereto" insert a period.
Column 3, line 38, "Bis-p'-n-octyloxybenzylidene)-chloro-p-" should be --Bis-(p'n-Octyloxybenzylidene)-chloro-p- --.

Signed and Sealed this

Fifth Day of April 1977

[SEAL]

Attest:

RUTH C. MASON
Attesting Officer

C. MARSHALL DANN
Commissioner of Patents and Trademarks